(12) United States Patent
Rossi

(10) Patent No.: US 7,821,555 B2
(45) Date of Patent: Oct. 26, 2010

(54) MULTI PATH POWER FOR CMOS IMAGERS

(75) Inventor: Giuseppe Rossi, Pasadena, CA (US)

(73) Assignee: Micron Technology, Inc., Boise, ID (US)

( * ) Notice: Subject to any disclaimer, the term of this patent is extended or adjusted under 35 U.S.C. 154(b) by 1769 days.

(21) Appl. No.: 10/419,235

(22) Filed: Apr. 21, 2003

(65) Prior Publication Data
US 2004/0207739 A1    Oct. 21, 2004

(51) Int. Cl.
H04N 3/14      (2006.01)
H04N 5/20      (2006.01)
H04N 5/217    (2006.01)
(52) U.S. Cl. .................. 348/300; 348/255; 250/208.1
(58) Field of Classification Search ............... 348/241, 348/255, 300–302, 307–310, 229.1, 230.1; 250/208.1; 341/155, 159, 161, 172
See application file for complete search history.

(56) References Cited

U.S. PATENT DOCUMENTS

| | | | | |
|---|---|---|---|---|
| 5,790,191 A * | 8/1998 | Zhang | ................. | 348/300 |
| 5,926,224 A * | 7/1999 | Nagasawa | .............. | 375/240.14 |
| 6,166,367 A * | 12/2000 | Cho | ................. | 250/208.1 |
| 6,339,216 B1 * | 1/2002 | Wake | ................. | 250/214 A |
| 6,366,320 B1 * | 4/2002 | Nair et al. | ................. | 348/300 |
| 6,480,132 B1 * | 11/2002 | Yoshioka et al. | ............ | 341/155 |
| 6,518,558 B1 * | 2/2003 | Bohm et al. | ............. | 250/208.1 |
| 6,707,492 B1 * | 3/2004 | Itani | ................. | 348/229.1 |
| 6,734,905 B2 * | 5/2004 | Fossum et al. | ............. | 348/300 |
| 6,831,690 B1 * | 12/2004 | John et al. | ................. | 348/302 |
| 7,062,168 B1 * | 6/2006 | Atwell et al. | ................. | 398/38 |
| 2004/0027472 A1 * | 2/2004 | Endo et al. | ................. | 348/308 |

* cited by examiner

*Primary Examiner*—David L Ometz
*Assistant Examiner*—Carramah J Quiett
(74) *Attorney, Agent, or Firm*—Dickstein Shapiro LLP

(57) ABSTRACT

An analog signal chain for a CMOS active pixel sensor imaging system utilizes, for each amplification stage, a plurality of fixed gain amplifiers instead of a single multi-gain amplifier. The fixed gain amplifier corresponding to the desired gain level is selected and powered on and coupled to the input/output signal paths, while the non-selected fixed gain amplifier(s) are powered off and isolated from the input/output signal paths. Each fixed gain amplifier is operated at a gain bandwidth corresponding to the timing requirements of the imaging system and the gain of the amplifier. Thus, each fixed gain amplifier (other than the one corresponding to the maximum gain of a comparable multi-gain amplifier) operates at a lower level of power consumption than the comparable multi-gain amplifier.

29 Claims, 4 Drawing Sheets

MULTI PATH POWER FOR CMOS IMAGERS

FIELD OF INVENTION

The present invention relates to a CMOS active pixel sensor system. More specifically, the present invention relates to a power conserving architecture for an analog read-out gain stage in a CMOS active pixel sensor system.

BACKGROUND OF THE INVENTION

FIG. 1 is an illustration of a color CMOS active pixel sensor (APS) system 100. The system 100 includes a N×M pixel array 101 comprised of pixels R, G, B respectively sensitive to red, green, and blue colored light. The pixels R, G, B are arranged in a Bayer pattern which models human visual response. In the Bayer pattern, alternating rows are comprised of green/red and green/blue pixels. Any image focused upon the pixel array causes the individual pixels to convert the incident light into electrical charge. Conventionally, each pixel outputs two signals, including a reset signal corresponding to a baseline voltage level, as well a photo signal corresponding to the base line voltage as modified by charge accumulation in the pixel (caused by incident light). These two signals may be considered as different components of a single differential signal, i.e., a pixel signal. The APS system 100 operates by reading the pixel signals of each row, one at a time, from the N×M pixel array to a N×1 row of pixel buffers 102. The pixels in each row are connected to respective column pixel buffers 102 designed to sample and hold both the reset and photo column signals output by the pixels of the array 101, and may be implemented, for example, using a plurality of sample-and-hold circuits. More specifically, the reset signal (Vrst) of each pixel in the current row is read into the row of pixel buffers 102, and then the photo signal (Vsig) of each pixel is then read into the row of pixel buffers 102.

The N×1 row of pixel buffers 102 are output to a N:1 multiplexer 103, which is used to sequentially select a column pixel output from the N×1 row of pixels for further processing by the analog signal processing chain 104. The analog signal processing chain 104 includes a variable gain stage which amplifies the differential pixel signals which are sequentially presented to multiplexer 103 to the extent required so that the amplified pixel signal will match well with the input to the analog-to-digital converter 106. The amplified signals are then supplied to the analog-to-digital converter 106, which converts the amplified voltages to a digital value, which is stored in buffer 107.

The above described process is repeated for each pixel in the N×1 row. When the last pixel has been processed, the procedure is repeated using another row, until each row of the pixel array has been processed. Once the digital values have been stored in the buffer, the digital processor 108 further processes values stored in the buffer. Such processing may include, for example, color interpolation, resolution scaling, noise reduction, white balance adjustment, or any other commonly performed pixel processing. The processed digital image can then be stored in a storage device 109. A controller 110 is used to coordinate the timing of the operations discussed.

An issue associated with a pixel read out system of the type illustrated in FIG. 1 is the power consumption of the analog signal chain 104. FIG. 2 is an illustration of a typical amplification stage 200 which may be found in an analog signal chain 104. The amplification stage 200 includes two substages 210, 220 coupled in series. Each stage is configured as a differential amplifier because the pixel signal is assumed to be a differential signal with Vrst on one input and Vsig on another. However, some imaging systems use single ended signals (where the Vrst and Vsig signals are subtracted before amplification) and would therefore use substages having single ended amplifiers.

The first substage 210 includes input terminals 211 which are coupled to input capacitors 212 via switch 211a. The input capacitors are selectively coupled via switches 213 to the inputs of an amplifier 214. The outputs of the amplifier 214 are coupled as inputs to the second substage 220. Additionally, the outputs of the amplifier 214 are also provided to a pair of feedback loops. The feedback loops include feedback capacitors 215, 216, each of which may be selectively coupled to the feedback loops via the states of switches 217, 218. Finally, reset switches 219 are used to selectively reset the amplifier by shorting across the feedback loop. The gain of the first substage 210 is proportional to the input capacitance divided by total feedback capacitance. In many instances, capacitors 215 and 216 have the same capacitance. Thus, the switches 217, 218 may be used to set the feedback loop capacitance to two non-zero values. The first substage 210, as illustrated, therefore provides for two levels of amplifier gain, depending upon the state of switches 217, 218. In many implementations, the first substage 210 is designed to provide a selectable gain of approximately 1.0 or approximately 2.0.

The second substage 220 include input capacitors 222 which are coupled to the inputs of amplifier 224. The outputs of the amplifier 224 is provided as the output of the amplification stage 200. Additionally, the outputs of the amplifier 224 are also provided to form a pair of feedback loops. The feedback loops include capacitors 225. Reset switches 229 are provided to reset the second substage 220 by shorting across the feedback loops. Typically, reset switches 219 and 229 are controlled by the same control signal, so that both substages 210, 220 are reset at the same time. One difference between the first 210 and second 220 substages is that input capacitors 222 and feedback capacitors 225 in the second substage 220 are variable capacitors. The use of variable capacitors permits the capacitance of the input and feedback capacitors to be controlled with a finer granularity. For example, in many implementations, the second substage 220 is designed to provide a selectable gain ranging from approximately 1.0 to approximately 8.0 in finer (e.g., $1/16^{th}$ gain) increments. The controller 110 (FIG. 1) may be used to control the selected gain level in both stages 210, 220.

Gain-bandwidth refers to an amplifier parameter which is proportional to both gain and bandwidth. In an amplifier, bandwidth is related to settling time, or the time required for the amplifier to produce a stable output signal from an input signal. Amplifiers 214, 224 must support a bandwidth which corresponds to a settling time which is at least equal to the timing requirements of the inputs to analog-to-digital converter 106. In similar amplifiers, such as a multiple gain amplifier operated at any one of its supported gain levels, the gain-bandwidth remains constant. Amplifiers 214, 224 therefore operate at the minimum required bandwidth at the highest gain level, and operate a higher bandwidths at lower gain levels.

That is, amplification substages which are designed to accommodate a wide range of gains are required to operate at a high level of gain-bandwidth and have a correspondingly high level of power consumption. Indeed, in a multi-gain amplification substage excess power is being consumed whenever the substage is not being operated at peak gain because an amplifier capable of being operated at maximum gain while meeting the minimum bandwidth requirement will operate at a bandwidth exceeding the minimum bandwidth requirement whenever the gain of the amplifier is below the maximum supported gain, since the gain bandwidth of the amplifier remains constant. If it is assumed that each gain level has an equal chance of being the appropriate gain level to match the pixel signal for color correction and/or analog to digital conversion, it can be seen that amplifiers which operate at a wide range of discrete gain levels spend most of their time at a gain level where excess power is consumed. In some CMOS APS sensor systems, approximately one third of the total sensor power consumption can be attributed to the power dissipated in the analog signal chain 104 and specifically in the FIG. 2 amplifier stage 200. Accordingly, there is a need and desire for a more efficient method and apparatus for amplifying a pixel signal.

SUMMARY OF THE INVENTION

The present invention is directed to method and apparatus for providing a multi-gain amplifier in a CMOS APS system. In the present invention, a plurality of amplifiers are used instead of one or two multi-gain amplifiers. Each amplifier of the present invention is preferably designed to operate at a single gain level, and is maintained in a switched off state unless required. Alternatively, each an amplifier may operate at multiple gain levels, but with less total gain level than a corresponding amplifier in a traditional CMOS APS system.

BRIEF DESCRIPTION OF THE DRAWINGS

The foregoing and other advantages and features of the invention will become more apparent from the detailed description of exemplary embodiments of the invention given below with reference to the accompanying drawings in which.

DETAILED DESCRIPTION OF THE INVENTION

Figures 3, 3A:
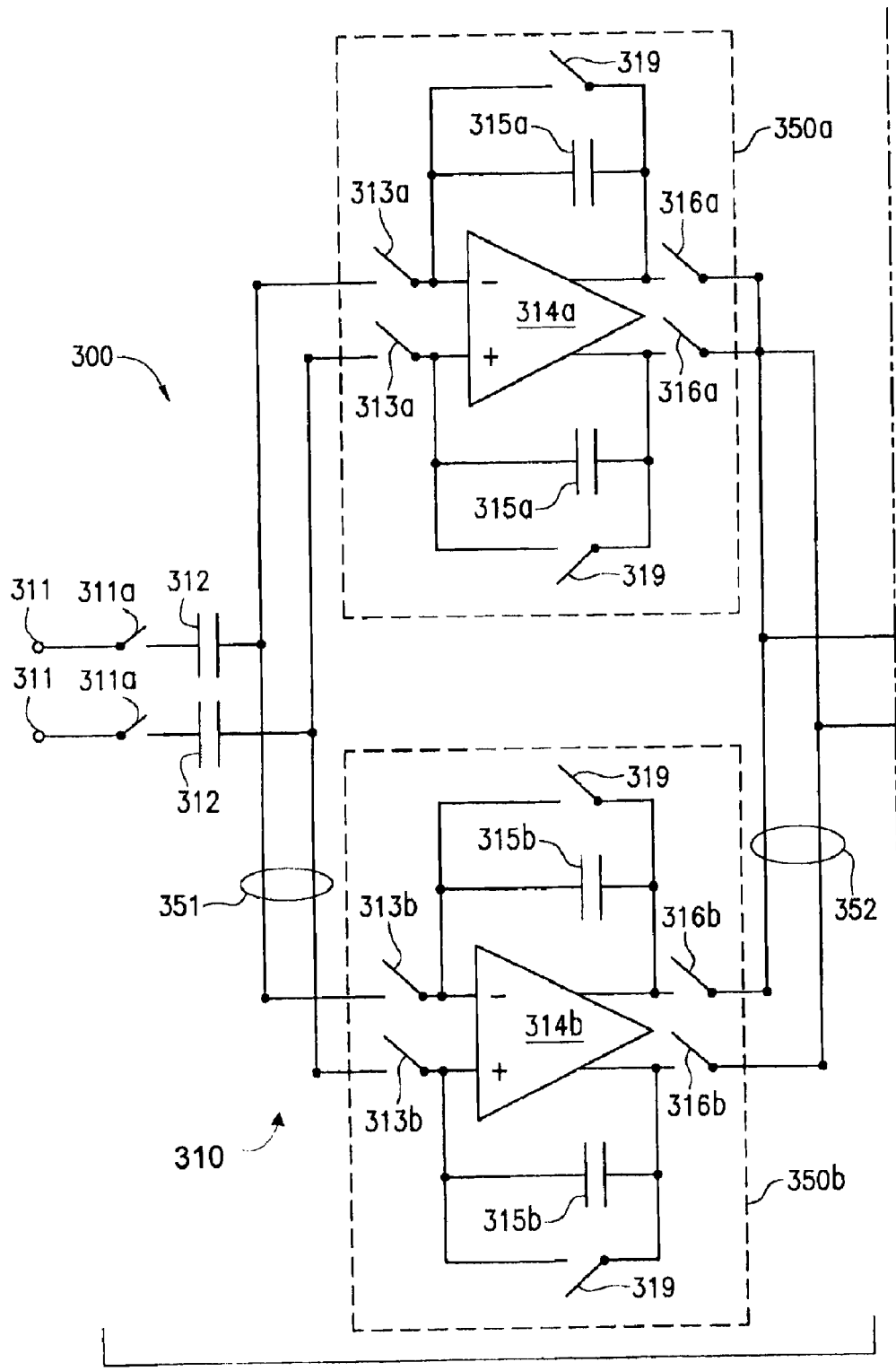
FIG. 3 is a block diagram of the amplification stage of an embodiment of the present invention.
Figures 3, 3B:
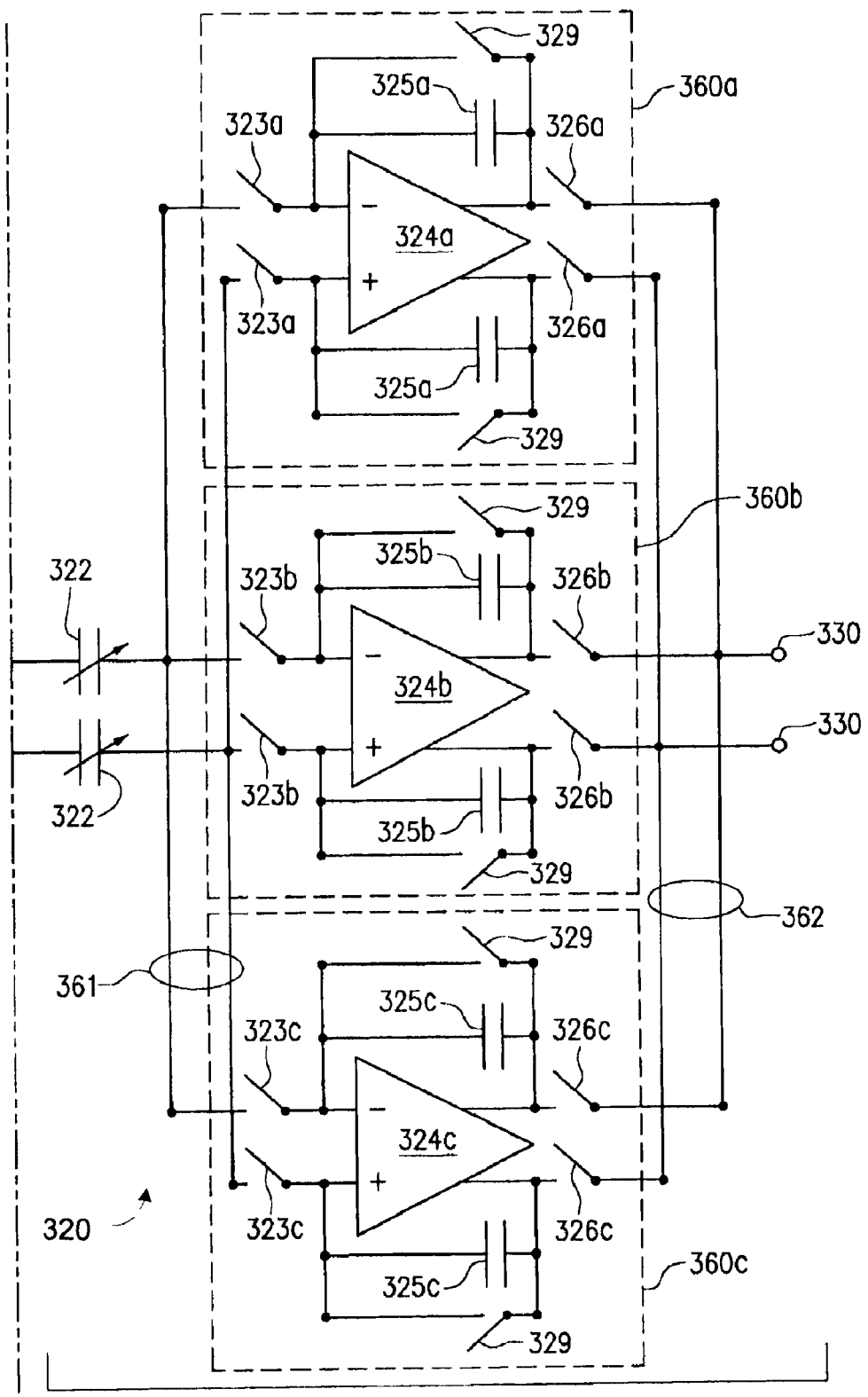

Now referring to the drawings, where like reference numerals designate like elements, there is shown in FIG. 3 an amplification stage 300 in accordance with the present invention. Amplification stage 300 is preferably divided into a first substage 310 and a second substage 320. Unlike the amplification substages 210, 220 of the prior art, which utilize a single amplifier circuit with variable levels of feedback capacitance to produce variable gain amplifiers, the first and second substages 310, 320 of the present invention are based upon multiple amplifier circuits, each having a fixed level of feedback capacitance, and therefore a fixed gain level when used with given level of input capacitance.

The first substage 310 includes a single set of input terminals 311 which are coupled, via switches 311a, to a single set of input capacitors 312. The input capacitors are also coupled to an first input bus 351, which may be selectively coupled via isolation switches 313a, 313b to either a first amplifier circuit 350a or a second amplifier circuit 350b. Each amplifier circuit 350a, 350b also includes a second set of isolation switches 316a, 316b, respectively, to selectively couple the first or second amplifier circuit 350a, 350b to an output bus 352. The output bus 352 is coupled to the variable input capacitors 322 of the second substage 320. The first and second sets of isolation switches are operated so that they take the same set of states at the same time. The first and second sets of isolation switches are also operated so that only one amplifier circuit 350a, 350b at any given time is coupled to both the input bus 351 and the output bus 352.

In addition to the isolation switches 313a, 313b, 316a, 316b each amplifier circuit 350a, 350b of the first substage 310 includes an amplifier 314a, 314b, a set of feedback capacitors 315a, 315b, and a set of reset switches 319, 329. The capacitance of the feedback capacitors associated with different amplifier circuits (e.g., 350a, 350b) of the same substage (e.g., 310) are set to different levels; i.e., substage 310, feedback capacitors 315a associated with amplifier circuit 350a has a difference capacitance than feedback capacitors 315b associated with amplifier circuit 350b. This causes each amplifier circuit (e.g., 350a, 350b) of a particular substage (e.g., 310) to produce different levels of gain while using the same input capacitors (e.g., 312).

Thus, in the present invention one of a plurality of amplifiers circuits 350a, 350b, each having a different fixed gain level is selected as required. Each amplifier circuit is separately powered and a non-selected amplifier circuit may be powered down.

The second substage 320 of the present invention is constructed in a similar manner. The second substage 320 includes a set of variable input capacitors 322, which are coupled to a second input bus 361, which may be selectively coupled via a third set of isolation switches 323a, 323b, 323c to one of amplifier circuits 360a, 360b, or 360c, respectively. Each amplifier circuit 360a, 360b, 360c includes a respective amplifier 324a, 324b, 324c, a set of feedback capacitors 325a, 325b, 325c, and reset switches 329. Each amplifier circuit 360a, 360b, 360c also includes a fourth set of isolation switches 326a, 326b, 326c respectively, to selectively couple the first, second, or third amplifier circuit 360a, 360b, 360c to an output bus 362. The output bus 362 is coupled to the output terminals 330 of the amplification stage 300. The third and fourth sets of isolation switches 323a, 323b, 323c, 326a, 326b, 326c are operated so that they take the same set of states at the same time. The third and fourth sets of isolation switches 323a, 323b, 323c, 324a, 324b, 324c are also operated so that only one amplifier circuit 360a, 360b, 360c at any given time is coupled to both the input bus 361 and the output bus 362, while the others may be powered down.

The present invention therefore operates each stage 310, 320 at a plurality of gain levels by selecting, at each substage, from a plurality of amplifiers (e.g., amplifier 314a or 314b in substage 310, and amplifiers 324a, 324b, or 324c in substage 320). Each amplifier is designed to work at a single gain level while meeting the minimum bandwidth requirement for analog-to-digital conversion, and non selected amplifiers can be powered off. In this manner, excess power is not being consumed in any amplifier.

Figure 1:
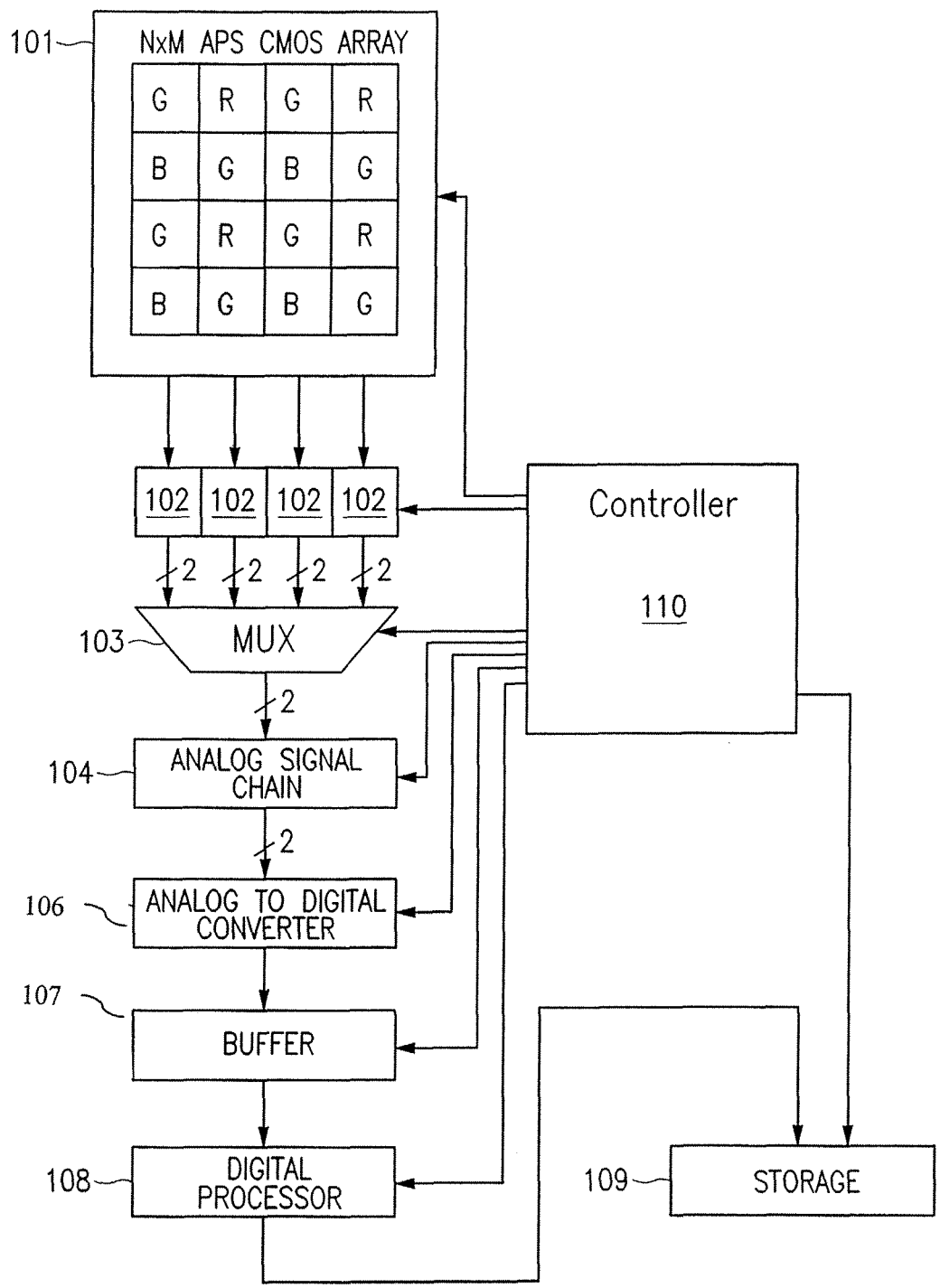
FIG. 1 is a block diagram of a CMOS APS system.
Figure 2:
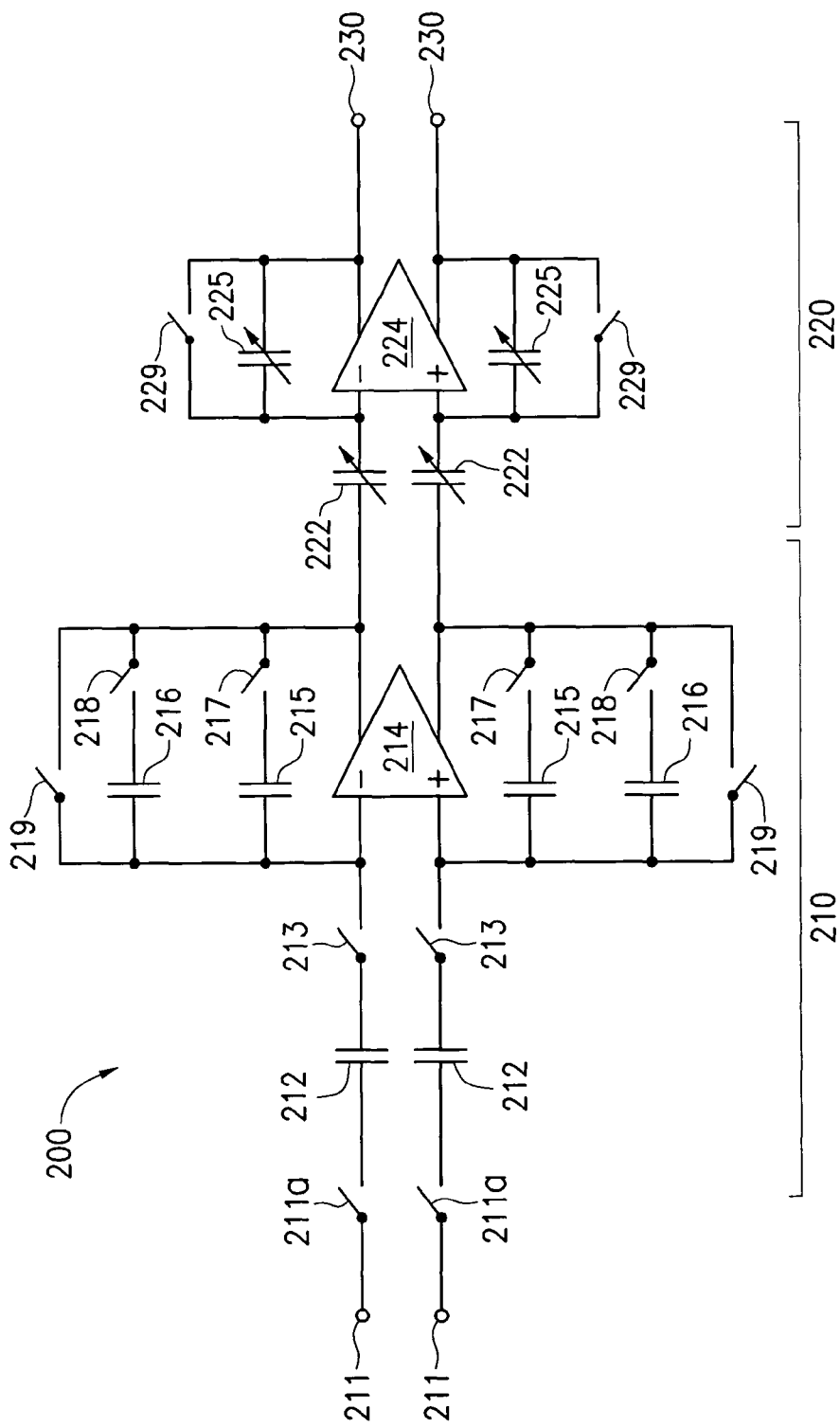
FIG. 2 is a block diagram of a prior art amplification stage.

The resulting power savings from this architecture can be significant. For example, suppose amplifier 214 (FIG. 2) is operated at gain levels 1.0 and 2.0, and spends 50 percent of its time at gain level 1.0 and 50 percent of its time at gain level 2.0. A suitable replacement using the architecture illustrated in FIG. 3 would have amplifier 314a operate at gain 1.0 and amplifier 314b operate at gain 2.0, with both amplifiers 314a, 314b having the same closed loop bandwidth as amplifier 214. The closed loop bandwidth (BW) of an amplifier is related to gain-bandwidth (GBW) as shown in equation (1):

$$BW = GBW \times Beta \qquad (1)$$

(where Beta is the amplifier feedback factor).

In a charge amplifier, Beta is related to gain G as shown in equation (2):

$$Beta=1/(G+1) \quad (2)$$

Finally, the bandwidth (BW), gain-bandwidth (GBW), and gain (G) are related as shown in equations (3)-(4):

$$BW=GBW/(G+1), \text{ or} \quad (3)$$

$$GBW=BW\times(G+1). \quad (4)$$

Thus, fixing the bandwidth (BW) and reducing the amplifier gain from 2.0 to 1.0, causes a reduction of the gain bandwidth of amplifier 314a from (3×BW) to (2×BW), or by 33%. This reduction in gain bandwidth lowers input transistor transconductance (gm) by the same amount, since transconductance is proportional to gain bandwidth. The power consumption proportional to the bias current level, which is proportional to the square of the transconductance.

Thus reducing the gm by 33% (from 1 to ⅔) translates into a power reduction of 5/9 (from 1 to 4/9), i.e., a power reduction to 44% of the power consumption of amplifier 214. Further, since each gain level is assumed to be required equally, the duty cycle of the amplifier is 50% and therefore the power consumption is reduced to 22% of the power consumption of amplifier 214.

The other 50% of the duty cycle is comprised of the power consumed by amplifier 314b, which is set to operate at a gain of 2.0 and has the same power consumption as amplifier 214, albeit at half the duty cycle. Thus the power consumption of amplifier 314b would be 50% that of amplifier 214, so the total power consumption in stage 310 would be 72% of the power consumption in stage 210.

A similar analysis can be performed on stage 320. In one preferred embodiment, amplifier 324a is operated at a gain range of 1.0-3.0, amplifier 324b is operated at gain range of 3.0-6.0, and amplifier 324c is operated at a gain range of 6-8, and amplifiers 324a, 324b, 324c serves to replace amplifier 224, which operates at a gain range of 1.0-8.0. The power consumption by amplifier 324a, 324b, 324c are at 20%, 61%, and 100%, respectively, that of the power consumption of amplifier 224. The expected duty cycle of the amplifiers 324a, 324b, 324c are assumed to be 37.5% (⅜), 37.5% (⅜), and 25% (²⁄₈). Thus the power consumption of stage 320 is (20%× 37.5%)+(61%×37.5%)+(100%×25%)=55% the power consumption of stage 220.

The present invention therefore implements each multiple gain amplification stage in the analog signal chain by selecting one of a plurality of fixed gain amplifiers. The selected amplifier is powered and coupled to the input and output signal paths. The non-selected amplifier(s) are powered down and isolated from the input and output signal paths. Each fixed gain amplifier is only required to support one gain level, thus, each fixed gain amplifier operates at its own gain-bandwidth while supporting the minimum bandwidth required to achieve a settling time required by the sample-and-hold circuit. Each fixed gain amplifier other than the one having the maximum gain operates at a lower level of power consumption than a comparable multi-gain amplifier. Although the illustrated embodiments are of differential amplifiers circuits amplifying two input signals, it should be recognized that the technique of the present invention is also applicable using one input amplifiers operating on single ended signals.

While the invention has been described in detail in connection with the exemplary embodiment, it should be understood that the invention is not limited to the above disclosed embodiment. Rather, the invention can be modified to incorporate any number of variations, alternations, substitutions, or equivalent arrangements not heretofore described, but which are commensurate with the spirit and scope of the invention. Accordingly, the invention is not limited by the foregoing description or drawings, but is only limited by the scope of the appended claims.

What is claimed as new and desired to be protected by Letters Patent of the United States is:

1. A method for amplifying a pixel signal, comprising:
   generating said pixel signal in a pixel;
   sampling said pixel signal from said pixel in a sample and hold circuit;
   selecting a first amplifier from a first plurality of amplifiers to receive and amplify said pixel signal, wherein each amplifier of said first plurality of amplifiers has a different gain and approximately equal settling time;
   outputting said pixel signal from said sample and hold circuit to said first amplifier;
   amplifying said pixel signal with said first amplifier;
   selecting a second amplifier from a second plurality of amplifiers to receive and amplify said pixel signal from said first amplifier, wherein each amplifier of said second plurality of amplifiers has a different gain and approximately equal settling time, and wherein each of said second plurality of amplifiers is selectively configurable to receive said pixel signal from any of said first plurality of amplifiers; and
   further amplifying said pixel signal with said second amplifier,
   wherein at least one non-selected amplifier of one of said first and second pluralities of amplifiers is powered off.

2. The method of claim 1, wherein every non-selected amplifier of said first plurality of amplifiers is powered off.

3. The method of claim 1, wherein selecting said first amplifier further comprises:
   coupling an input terminal of said first amplifier to an output of said sample and hold circuit; and
   coupling an output terminal of said first amplifier to a first output terminal.

4. The method of claim 1, wherein said pixel signal is a single ended signal.

5. The method of claim 1, wherein said pixel signal is a double ended signal.

6. The method of claim 5, wherein said pixel signal includes one component corresponding to a pixel reset signal and another component corresponding to a pixel image signal.

7. The method of claim 1, wherein a non-selected amplifier of said second plurality of amplifiers is powered off.

8. The method of claim 1, wherein every non-selected amplifier of said second plurality of amplifiers is powered off.

9. The method of claim 3, wherein said selecting further comprises:
   coupling an input terminal of said second amplifier to a second input terminal; and
   coupling an output terminal of said second amplifier to a second output terminal.

10. A device for amplifying a pixel signal, comprising:
    at least one input terminal for receiving the pixel signal output from a pixel of a pixel array;
    at least one output terminal for outputting an amplified pixel signal;
    an amplification stage connected between the input and output terminals and comprising at least first and second substages, said first and second substages each comprising:
       a plurality of amplifiers, each having a different gain and a settling time approximately equal to that of the other amplifiers; and a selection circuit for selecting one of said plurality of amplifiers to be powered and connected between the at least one input terminal and the at least one output terminal, wherein each amplifier of said plurality of amplifiers of said second substage is selectively configurable to receive and amplify said pixel signal from said first substage.

11. The device of claim 10, further comprising,
at least one input capacitor coupled between said at least one input terminal and said first substage.

12. The device of claim 11, wherein said at least one input terminal comprises a pair of input terminals, said at least one output terminal comprises a pair of output terminals, and each of said plurality of amplifiers comprises a differential charge amplifier having a pair of input terminals and a pair of output terminals.

13. The device of claim 11, wherein said at least one input terminal comprises a single input terminal, said at least one output terminal comprises a single output terminal, and each of said plurality of amplifiers comprises a charge amplifier having a single input terminal and a single output terminal.

14. The device of claim 10, wherein said plurality of amplifiers is two amplifiers.

15. The device of claim 10, wherein said plurality of amplifiers is three amplifiers.

16. The device of claim 14, wherein the two amplifiers respectively have gains of approximately 1.0 and approximately 2.0.

17. An imaging system, comprising:
a pixel array including a plurality of pixels, wherein each pixel is configured to generate and output a pixel signal;
at least one sample and hold circuit for sampling said pixel signal; and
an analog signal circuit path coupled to said at least one sample and hold circuit,
wherein said analog signal circuit path comprises at least one amplifying stage including first and second substages, each of said first and second substages comprising:
at least one input terminal for receiving said pixel signal from said sample and hold circuit;
at least one output terminal for outputting an amplified pixel signal;
a plurality of amplifiers, arranged in parallel, each having a different gain and a settling time approximately equal to that of the other amplifiers, wherein each of said plurality of amplifiers is selectively configurable to receive and amplify said pixel signal from said at least one input terminal; and
a selection circuit for selecting one of said plurality of amplifiers to be powered and coupled between said at least one input terminal and said at least one output terminal.

18. The imaging system of claim 17, further comprising:
at least one input capacitor respectively coupled between said at least one input terminal and said first substage.

19. The imaging system of claim 18, wherein said at least one input terminal comprises a pair of input terminals, said at least one output terminal comprises a pair of output terminals, and each of said plurality of amplifiers comprises a differential charge amplifier having a pair of input terminals and a pair of output terminals.

20. The imaging system of claim 18, wherein said at least one input terminal comprises a single input terminal, said at least one output terminal comprises a single output terminal, and each of said plurality of amplifiers comprises a charge amplifier having a single input terminal and a single output terminal.

21. The imaging system of claim 17, wherein said plurality of amplifiers in one of said first and second substages is two amplifiers.

22. The imaging system of claim 17, wherein said plurality of amplifiers in one of said first and second substages is three amplifiers.

23. The imaging system of claim 21, wherein the two amplifiers respectively have gains of approximately 1.0 and approximately 2.0.

24. An imaging system, comprising:
a pixel array including a plurality of pixels, wherein each pixel is configured to generate and output a pixel signal;
at least one sample and hold circuit for sampling a pixel signal output from at least one of said plurality of pixels;
an analog signal circuit path coupled to said at least one sample and hold circuit for amplifying said sampled pixel signal; and
an analog-to-digital converter for converting said amplified pixel signal received from said analog signal circuit path to a digital signal,
wherein said analog signal circuit path includes an amplification stage including first and second substages, each of said first and second substages comprising:
a plurality of amplifiers, arranged in parallel, each having a different gain, wherein each of said amplifiers is selectively configurable to receive and amplify said sampled pixel signal; and
a selection circuit for selecting one of said plurality of amplifiers to be powered and used to amplify said pixel signal.

25. The imaging system of claim 24, wherein said selection circuit of at least one of said first and second amplification stages is configured to select one of said plurality of amplifiers based on a level of said pixel signal and a desired range of input levels to be received by said analog-to-digital converter.

26. The imaging system of claim 24, wherein said selection circuit of at least one of said first and second amplification stages is configured to select one of said plurality of amplifiers based on a desired color correction.

27. The imaging system of claim 24, wherein said at least one sample and hold circuit is configured to receive pixel signals from all pixels in a single column of said pixel array.

28. The imaging system of claim 24, wherein said at least one sample and hold circuit is configured to receive pixel signals from all pixels from multiple columns of said pixel array.

29. The imaging system of claim 24, wherein said at least one sample and hold circuit is configured to receive pixel signals from pixels of multiple columns of said pixel array.

* * * * *